United States Patent
Ghag et al.

(10) Patent No.: US 12,271,749 B2
(45) Date of Patent: Apr. 8, 2025

(54) CONTAINERIZED WORKLOAD SCHEDULING

(71) Applicant: VMware LLC, Palo Alto, CA (US)

(72) Inventors: Aditi Ghag, Palo Alto, CA (US);
Pranshu Jain, Palo Alto, CA (US);
Yaniv Ben-Itzhak, Herzliya (IL);
Sujata Banerjee, Palo Alto, CA (US);
Yongzhe Fan, Beijing (CN)

(73) Assignee: VMWare LLC, Palo Alto, CA (US)

( * ) Notice: Subject to any disclaimer, the term of this patent is extended or adjusted under 35 U.S.C. 154(b) by 0 days.

(21) Appl. No.: 16/394,663

(22) Filed: Apr. 25, 2019

(65) Prior Publication Data

US 2020/0341789 A1 Oct. 29, 2020

(51) Int. Cl.
| | |
|---|---|
| G06F 9/50 | (2006.01) |
| G06F 9/455 | (2018.01) |
| H04L 12/26 | (2006.01) |
| H04L 29/08 | (2006.01) |
| H04L 43/0876 | (2022.01) |

(52) U.S. Cl.
CPC ...... *G06F 9/45558* (2013.01); *H04L 43/0876* (2013.01); *G06F 2009/45595* (2013.01)

(58) Field of Classification Search
CPC ....... G06F 9/45558; G06F 2009/45595; H04L 43/0876
USPC ........................................................ 709/224
See application file for complete search history.

(56) References Cited

U.S. PATENT DOCUMENTS

| | | | |
|---|---|---|---|
| 7,693,050 B2 * | 4/2010 | Achlioptas | H04L 67/1008 709/217 |
| 8,010,469 B2 | 8/2011 | Kapoor et al. | |
| 8,250,213 B2 | 8/2012 | Glover et al. | |
| 8,799,920 B2 * | 8/2014 | Lubsey | G06F 9/5011 718/104 |
| 9,244,669 B2 * | 1/2016 | Govindaraju | G06F 8/61 |
| 9,256,467 B1 * | 2/2016 | Singh | G06F 9/5055 |
| 9,294,407 B2 | 3/2016 | Antony | |
| 9,301,026 B2 * | 3/2016 | Srinivas | H04L 41/12 |
| 9,621,427 B1 | 4/2017 | Shah et al. | |
| 10,031,783 B2 * | 7/2018 | Jalagam | G06F 8/61 |
| 10,055,262 B1 * | 8/2018 | Thomas | G06F 9/5083 |
| 10,075,377 B1 * | 9/2018 | Sharma | H04L 43/0876 |
| 10,075,514 B2 * | 9/2018 | Wang | H04L 67/1001 |
| 10,120,665 B1 * | 11/2018 | Sunarno | G06F 11/34 |
| 10,191,778 B1 * | 1/2019 | Yang | G06F 11/301 |
| 10,241,840 B2 | 3/2019 | Tsai et al. | |
| 10,250,443 B2 | 4/2019 | Chandrashekhar et al. | |
| 10,282,222 B2 * | 5/2019 | Thakkar | G06F 9/5088 |
| 10,382,266 B1 | 8/2019 | Balakrishnan et al. | |

(Continued)

*Primary Examiner* — Hee Soo Kim
*Assistant Examiner* — Golam Mahmud
(74) *Attorney, Agent, or Firm* — Quarles & Brady LLP

(57) ABSTRACT

A method for containerized workload scheduling can include monitoring network traffic between a first containerized workload deployed on a node in a virtual computing environment to determine affinities between the first containerized workload and other containerized workloads in the virtual computing environment. The method can further include scheduling, based, at least in part, on the determined affinities between the first containerized workload and the other containerized workloads, execution of a second containerized workload on the node on which the first containerized workload is deployed.

26 Claims, 5 Drawing Sheets

(56) References Cited

U.S. PATENT DOCUMENTS

| | | | |
|---|---|---|---|
| 10,452,572 B2* | 10/2019 | Lu | G06F 9/4812 |
| 10,466,899 B2* | 11/2019 | Nagarajan | G06F 3/0644 |
| 10,673,952 B1* | 6/2020 | Cohen | H04L 67/10 |
| 2002/0143953 A1* | 10/2002 | Aiken, Jr. | H04L 67/14 709/227 |
| 2011/0078303 A1 | 3/2011 | Li et al. | |
| 2012/0066487 A1* | 3/2012 | Brown | H04L 67/1027 709/224 |
| 2012/0204176 A1 | 8/2012 | Tian et al. | |
| 2013/0042003 A1 | 2/2013 | Franco et al. | |
| 2013/0054861 A1* | 2/2013 | Tsirkin | G06F 13/28 710/266 |
| 2013/0108259 A1* | 5/2013 | Srinivas | H04Q 11/0066 398/25 |
| 2014/0007091 A1 | 1/2014 | Arges et al. | |
| 2014/0067999 A1 | 3/2014 | Lee et al. | |
| 2014/0173595 A1* | 6/2014 | Anand | G06F 9/5033 718/1 |
| 2014/0201218 A1* | 7/2014 | Catalano | H04L 47/803 707/748 |
| 2014/0245318 A1 | 8/2014 | Adams et al. | |
| 2015/0039764 A1 | 2/2015 | Beloglazov et al. | |
| 2015/0071072 A1* | 3/2015 | Ratzin | G06F 9/544 370/235 |
| 2015/0074262 A1 | 3/2015 | Antony | |
| 2015/0089501 A1 | 3/2015 | Ganesan et al. | |
| 2015/0149611 A1 | 5/2015 | Lissack | |
| 2015/0341223 A1 | 11/2015 | Shen et al. | |
| 2016/0022006 A1 | 1/2016 | Rabe et al. | |
| 2016/0092259 A1 | 3/2016 | Mehta et al. | |
| 2016/0103699 A1* | 4/2016 | Thakkar | G06F 9/45558 718/1 |
| 2016/0124742 A1 | 5/2016 | Rangasamy et al. | |
| 2016/0162320 A1* | 6/2016 | Singh | G06F 9/45533 718/1 |
| 2016/0357451 A1 | 12/2016 | Chen et al. | |
| 2016/0364304 A1 | 12/2016 | Hanumantharaya et al. | |
| 2017/0010907 A1 | 1/2017 | Challa et al. | |
| 2017/0050111 A1 | 2/2017 | Perry et al. | |
| 2017/0109184 A1 | 4/2017 | Ramani et al. | |
| 2017/0187785 A1 | 6/2017 | Johnson et al. | |
| 2017/0277554 A1 | 9/2017 | Oehrlein et al. | |
| 2017/0302523 A1 | 10/2017 | Shah et al. | |
| 2017/0302542 A1* | 10/2017 | Ruan | H04L 43/0864 |
| 2017/0353516 A1 | 12/2017 | Gordon | |
| 2017/0366405 A1 | 12/2017 | Ganesan et al. | |
| 2017/0374032 A1* | 12/2017 | Woolward | H04L 63/0263 |
| 2018/0027060 A1 | 1/2018 | Metsch et al. | |
| 2018/0089053 A1 | 3/2018 | Chen et al. | |
| 2018/0101486 A1 | 4/2018 | Lu et al. | |
| 2018/0109606 A1 | 4/2018 | Alpert et al. | |
| 2018/0121250 A1 | 5/2018 | Qi et al. | |
| 2018/0123939 A1 | 5/2018 | Raman et al. | |
| 2018/0136931 A1* | 5/2018 | Hendrich | G06F 11/30 |
| 2018/0139148 A1 | 5/2018 | Gamage et al. | |
| 2018/0176102 A1* | 6/2018 | Bansal | H04L 67/51 |
| 2018/0198812 A1* | 7/2018 | Christodorescu | H04L 63/1425 |
| 2018/0203736 A1* | 7/2018 | Vyas | G06F 9/45558 |
| 2018/0241802 A1* | 8/2018 | Bernat | H04L 43/0894 |
| 2018/0287903 A1* | 10/2018 | Joshi | H04L 43/062 |
| 2019/0026082 A1 | 1/2019 | Shalev et al. | |
| 2019/0034228 A1 | 1/2019 | He et al. | |
| 2019/0042298 A1* | 2/2019 | Sunku | G06F 9/5027 |
| 2019/0044802 A1* | 2/2019 | Gibbon | H04L 41/40 |
| 2019/0116110 A1* | 4/2019 | Raney | G06F 8/60 |
| 2019/0165852 A1* | 5/2019 | Coleman | H04L 41/0668 |
| 2019/0190838 A1* | 6/2019 | Shpiner | H04L 47/2483 |
| 2019/0235901 A1* | 8/2019 | Aiyar | G06F 9/5083 |
| 2019/0235922 A1 | 8/2019 | Iovanna et al. | |
| 2019/0243561 A1 | 8/2019 | Battaiola Kreling et al. | |
| 2019/0312933 A1* | 10/2019 | Richards | G06F 16/24552 |
| 2019/0327112 A1 | 10/2019 | Nandoori et al. | |
| 2019/0354403 A1* | 11/2019 | Ayyagari | G06F 3/061 |
| 2020/0026560 A1* | 1/2020 | Singh | G06F 9/5083 |
| 2020/0026850 A1 | 1/2020 | Levin et al. | |
| 2020/0028935 A1* | 1/2020 | Sahay | G06F 9/5088 |
| 2020/0089516 A1* | 3/2020 | Vijayvargiya | H04L 41/0813 |
| 2020/0192692 A1 | 6/2020 | Ghag et al. | |
| 2020/0213239 A1 | 7/2020 | Cheng | |
| 2020/0233692 A1 | 7/2020 | Kandula | G06F 8/61 |
| 2020/0267071 A1* | 8/2020 | Ghag | G06F 11/301 |
| 2020/0310847 A1* | 10/2020 | Schulze | H04L 67/10 |
| 2020/0334065 A1* | 10/2020 | Wang | G06F 9/5077 |
| 2021/0042151 A1 | 2/2021 | Müller et al. | |

\* cited by examiner

CONTAINERIZED WORKLOAD SCHEDULING

BACKGROUND

Virtual computing instances (VCIs), such as virtual machines, virtual workloads, data compute nodes, clusters, and containers, among others, have been introduced to lower data center capital investment in facilities and operational expenses and reduce energy consumption. A VCI is a software implementation of a computer that executes application software analogously to a physical computer. VCIs have the advantage of not being bound to physical resources, which allows VCIs to be moved around and scaled to meet changing demands of an enterprise without affecting the use of the enterprise's applications. VCIs can be deployed on a hypervisor provisioned with a pool of computing resources (e.g., processing resources, memory resources, etc.). There are currently a number of different configuration profiles for hypervisors on which VCIs may be deployed.

DETAILED DESCRIPTION

Figure 1:
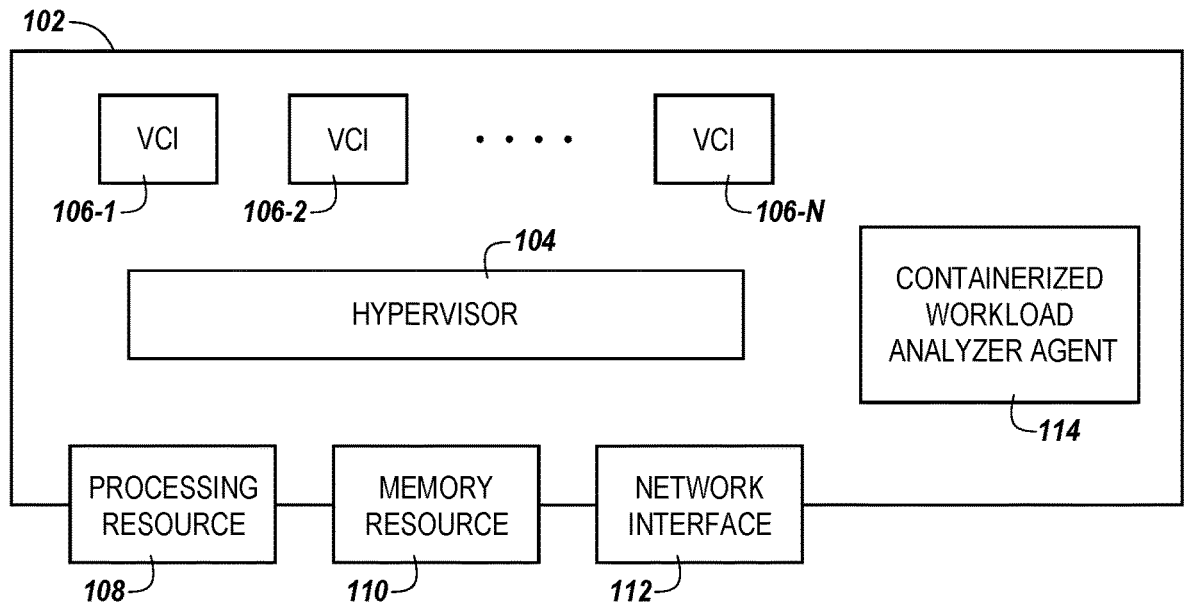
FIG. 1 is a diagram of a host for containerized workload scheduling according to the present disclosure.

The term "virtual computing instance" (VCI) covers a range of computing functionality. VCIs may include data compute nodes such as virtual machines (VMs). Containers can run on a host operating system without a hypervisor or separate operating system, such as a container that runs within Linux. A container can be provided by a virtual machine that includes a container virtualization layer (e.g., Docker). A VM refers generally to an isolated end user space instance, which can be executed within a virtualized environment. Other technologies aside from hardware virtualization can provide isolated end user space instances may also be referred to as VCIs. The term "VCI" covers these examples and combinations of different types of VCIs, among others.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. The host operating system can use name spaces to isolate the containers from each other and therefore can provide operating-system level segregation of the different groups of applications that operate within different containers. This segregation is akin to the VM segregation that may be offered in hypervisor-virtualized environments that virtualize system hardware, and thus can be viewed as a form of virtualization that isolates different groups of applications that operate in different containers. Such containers may be more "lightweight" than VMs at least because they share an operating system rather than operating with their own guest operating system.

Multiple VCIs can be configured to be in communication with each other in a software defined data center. In such a system, information can be propagated from an end user to at least one of the VCIs in the system, between VCIs in the system, and/or between at least one of the VCIs in the system and a non-virtualized physical host.

Software defined data centers are dynamic in nature. For example, VCIs and/or various application services, may be created, used, moved, or destroyed within the software defined data center. When VCIs are created (e.g., when a container is initialized), various processes and/or services start running and consuming resources. As used herein, "resources" are physical or virtual components that have a finite availability within a computer or software defined data center. For example, resources include processing resources, memory resources, electrical power, and/or input/output resources, etc.

Containerized cloud-native applications can be used to accelerate application delivery in software defined data centers. As used herein, "containerized" or "containerization" refers to a virtualization technique in which an application (or portions of an application, such as flows corresponding to the application) are encapsulated into a container (e.g., Docker, Linux containers, etc.) as an alternative to full machine virtualization. Because containerization can include loading the application on to a VCI, the application may be run on any suitable physical machine without worrying about application dependencies. Further, as used herein, "cloud-native applications" refer to applications (e.g., computer programs, software packages, etc.) that are assembled as containerized workloads (e.g., microservices) in containers deployed in a software defined data center. "Containerized workloads" or "microservices" refer to a computing architecture in which an application is structured as a collection of loosely coupled (e.g., containerized) services. Containerized workload architectures may allow for improved application modularity, scalability, and continuous deployment in comparison to traditional application development environments.

In order to take advantage of the perceived benefits of containerized cloud-native applications, container schedulers such as KUBERNETES®, DOCKER SWARM®, MESOS®, etc. can be used to deploy and/or manage containerized applications. Container schedulers can consider parameters associated with the software defined data center on which they operate to deploy and/or manage the containerized applications. In some approaches, the parameters considered by the container scheduler can include host VCI resources (e.g., host VCI processing resources and/or memory resources), host VCI processing resource and/or memory resource utilization, and/or policy-based affinity rules (e.g., policy-based rules that can control the placement of VCIs and/or containers on host machines within a virtual cluster) as part of scheduling deployment and/or managing containers. This may be sub-optimal as the requirements of software defined data centers continue to expand.

For example, software defined data centers currently host a wide spectrum of applications with different needs, and therefore disparate application performance requirements. As the use of software defined data centers continues to increase, the spectrum of applications hosted on software defined data centers will continue to increase, further emphasizing the disparate performance requirements of the applications. For example, due to the dynamic nature of applications deployed in a software defined data center (e.g., applications running on VCIs, computers, etc. of the software defined data center), resource requirements of the applications may evolve over time, which can lead situations in which some approaches fail to adequately address evolving application performance requirements.

For example, in some approaches, multi-tenant applications can be scheduled on nodes (e.g., VCIs, hypervisors, etc.) in public cloud environments such that some of the containerized workloads executed as part of performance of the applications are co-located on a same node. As used herein, a "node" refers to a computing instance on which an application may be executed. Examples of nodes can include, but are not limited to VCIs, hypervisors, containers, etc. However, in some approaches, it my not be possible to schedule execution of containerized workloads that correspond to particular applications on a same node due to resource constraints. That is, in some approaches, it may not be possible to schedule containerized workload execution for a particular application such that the containers in which containerized workloads corresponding to a particular application are co-located on a same node.

In some approaches, static dependencies (e.g., dependencies on database services) between containerized workloads containers may be taken into account when scheduling execution of containerized workloads and/or when deploying containers to run the containerized workloads. However, some approaches fail to take communication patterns between containerized workloads, which can vary over time, into account when scheduling execution of containerized workloads and/or when deploying containers to run the containerized workloads. Such approaches may be problematic due to the dynamic nature of applications deployed in a software defined data center, and hence, containerized workload execution and/or container deployment in the software defined data center. For example, because application latencies may not be adequately handled in approaches which rely merely on static dependencies between containerized workloads, such latencies may affect application deployment in a software defined data center. Similarly, application latencies may not be adequately handled in approaches that fail to consider communication patterns between containerized workloads.

In order to address the dynamic nature of applications hosted on software defined data centers, embodiments disclosed herein can allow for a scheduling agent or a containerized workload analyzer agent to monitor communication patterns between containerized workloads to assess inter-containerized workload interactions in real time. In contrast to approaches that fail to consider communication patterns between containerized workload, embodiments herein can allow for inter-containerized workload interactions to be monitored, analyzed, and/or determined, and the information gleaned from such monitoring, analysis, and/or determinations can be utilized to schedule execution of containerized workloads and/or containers to run the containerized workloads such that latencies associated with execution of the containerized workloads are reduced or minimized. For example, by utilizing information corresponding to the inter-containerized workload interactions, embodiments herein can allow for containerized workloads that interact with one another or that exhibit particular communication patterns to be scheduled such that they are co-located on a same node. This can, in some embodiments, reduce latencies that are incurred in approaches that rely merely on static dependencies between containerized workloads or fail to consider communication patterns between containerized workloads, which can lead to overall improvement in the functioning of computing device or software defined data center in which the containerized workloads are executed.

For example, embodiments herein can allow for improved application performance by monitoring and analyzing subsets of containerized workloads that exhibit particular communication patterns (e.g., a correspondence) between one another and prioritizing scheduling of execution of such containerized workloads such that the containerized workloads that exhibit such communication patterns are co-located on a same node. Because the communication patterns between the containerized workloads can be dynamically altered, in some embodiments, predictive techniques can be utilized to facilitate scheduling of execution of such containerized workloads such that containerized workloads that exhibit particular communication patterns are co-located on a same node. The communication patterns can shed light on interactions between containerized workloads and may be learned over time, as described in more detail, herein, and execution of containerized workloads can be scheduled based on the communication patterns.

In some embodiments, the learned communication patterns can be used to generate and assign affinities between containerized workloads that interact with one another. For example, the learned patterns can be used to generate and assign weights between containerized workloads that interact with one another. The weights can, in some embodiments, be calculated based on application programming interface (API) traffic between one or more containerized workloads that interact with one another, as described in more detail in connection with FIG. 1, herein. The weights can be used to generate and/or assign scores or ratings to various nodes in the software defined data center. The weights, scores, and/or ratings can be provided to a scheduler that can then determine nodes on which to schedule execution of containerized workloads and/or containers to run the containerized workloads. As used herein, "affinities" between containerized workloads refer to various parameters that characterize interactions and/or communication patterns between containerized workloads. Non-limiting examples of affinities can include determined weights between containerized workloads and/or scores and/or ratings of nodes that are based on the interactions and/or communication patterns between the containerized workloads, among other parameters that characterize relationships between containerized workloads, as described in more detail herein.

For instance, a method for containerized workload scheduling can include monitoring network traffic between a first containerized workload deployed on a node in a virtual computing environment and other containerized workloads in the virtual computing environment to determine affinities between the first containerized workload and other containerized workloads in the virtual computing environment. In some embodiments, the method for containerized workload scheduling can include scheduling, based, at least in part, on the determined affinities between the first containerized workload and the other containerized workloads, execution of a second containerized workload on the node on which the first containerized workload is deployed.

Other embodiments can include monitoring network traffic corresponding to a plurality of containerized workloads deployed in a virtual computing environment by determining a correspondence between nodes on which the plurality of containerized workloads are deployed, determining one or more affinities between containerized workloads among the plurality of containerized workloads based, at least in part, on determined traffic characteristics between the plurality of containerized workloads, and/or scheduling execution of a containerized workload on a node in the virtual computing system based, at least in part, on the determined correspondence between the nodes and the determined traffic characteristics between the plurality of containerized workloads, as described in more detail, herein.

In some embodiments, an example non-transitory machine-readable medium can store instructions executable by a processing resource of a computing system to cause the computing system to monitor a first containerized workload deployed on a node in a virtual computing environment to determine affinities between the first containerized workloads and other containerized workloads in the virtual computing environment, assign weights to each of the affinities between the first containerized workload and the other containerized workloads, and/or schedule, based, at least in part, on the weights between the first containerized workload and the other containerized workloads, execution of a container to run a second containerized workload on the node on which the first containerized workload is deployed.

In some embodiments, an apparatus for containerized workload scheduling can include a containerized workload analyzer agent provisioned with processing resources and ultimately executed by hardware. The containerized workload analyzer agent can be configured to monitor network traffic between a plurality of containerized workloads running on a plurality of nodes to determine affinities between the plurality of containerized workloads, generate respective node assignment scores for the plurality of containerized workloads based, at least, in part, on the monitored network traffic, and/or schedule execution of a containerized workload based, at least in part, on the respective node assignment scores.

In yet another embodiment, a system for containerized workload scheduling can include a virtual computing cluster (VCC), a plurality of virtual computing instances (VCIs) deployed within the VCC, and a containerized workload analyzer agent deployed within the VCC that is provisioned with processing resources and ultimately executed by hardware. The containerized workload analyzer agent can be configured to monitor network traffic corresponding to a plurality of containerized microservices deployed in the VCC by determining a correspondence between nodes on which the plurality of containerized workloads are deployed and determine one or more affinities between containerized workloads among the plurality of containerized workloads based, at least in part, on determined traffic characteristics between the plurality of containerized workloads. In some embodiments, the containerized workload analyzer agent can rank nodes on which to schedule execution of a containerized in the VCC based, at least in part, on the determined correspondence between the nodes and the determined traffic characteristics between the plurality of containerized workloads and/or schedule execution of a second containerized workload on a node in VCC based, at least in part, on the rank of the node.

As used herein, designators such as "N," "M," "X," "Y," "Z," etc., particularly with respect to reference numerals in the drawings, indicate that a number of the particular feature so designated can be included. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to."

The figures herein follow a numbering convention in which the first digit or digits correspond to the drawing figure number and the remaining digits identify an element or component in the drawing. Similar elements or components between different figures may be identified by the use of similar digits. For example, 106 may reference element "06" in FIG. 1, and a similar element may be referenced as 206 in FIG. 2. A group or plurality of similar elements or components may generally be referred to herein with a single element number. For example, a plurality of reference elements 106-1, 106-2, . . . , 106-N may be referred to generally as 106. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments and should not be taken in a limiting sense.

Embodiments of the present disclosure are directed to containerized workload scheduling, for example, in the context of a software defined data center (e.g., a distributed computing environment) including one or more hypervisors, VCIs and/or containers. As described above, "containerized workloads" (e.g., microservices) refer to containerized instructions that correspond to portions of an application and are structured as a collection of loosely coupled (e.g., containerized) services. Containerized workloads can be created using different coding languages (e.g., as part of a polyglot approach to application deployment). For example, in a containerized workload or microservice architecture, an application can be divided into multiple modular services that can be deployed on containers. The containerized workloads can run fine-grained services, and the containers can have short lifespans. As used herein, "fine-grained services" refer to services that make direct use of resources that are granted direct access by one or more application programming interfaces (APIs). In contrast, "coarse-grained services" include services that utilize multiple fine-grained services. Further, as used herein, a "short lifespan" refers to a container that is destroyed after a short period of time (e.g., seconds to minutes), as compared to "long lifespan" containers, which operate for minutes or more before being destroyed. In some embodiments, short lifespan containers are containers that run containerized workloads, which are generally destroyed after a relatively short period of time once the containerized workload has been executed and consumed by an application.

Due to the short-lived nature of containers on which containerized workloads are deployed, haphazard scheduling of the containerized workloads can incur unwanted latencies in application execution. For example, latencies associated with application execution can exceed desirable thresholds, which can reduce the efficacy of a software defined data center. In addition, network latencies and/or throughput between individual containerized workloads can affect performance of an application that is associated with the containerized workloads.

Embodiments herein may allow for improved scheduling of containerized workloads that can lead to improved performance of a computing system such as a software defined data center, virtual computing cluster, server, or other computing device. For example, by scheduling containerized workloads in accordance with the embodiments described herein, applications can be assembled from containerized workloads more efficiently than in some approaches, which can reduce an amount of computing resources and/or an amount of time required to execute the application. This can lead to reduced downtime, quicker application execution, and/or improved user experience.

FIG. 1 is a diagram of a host 102 for containerized workload scheduling according to the present disclosure. The host 102 can be provisioned with processing resource(s) 108 (e.g., one or more processors), memory resource(s) 110 (e.g., one or more main memory devices and/or storage memory devices), and/or a network interface 112. The host 102 can be included in a software defined data center. A software defined data center can extend virtualization concepts such as abstraction, pooling, and automation to data center resources and services to provide information technology as a service (ITaaS). In a software defined data center, infrastructure, such as networking, processing, and security, can be virtualized and delivered as a service. A software defined data center can include software defined networking and/or software defined storage. In some embodiments, components of a software defined data center can be provisioned, operated, and/or managed through an application programming interface (API).

The host 102 can incorporate a hypervisor 104 that can execute a number of VCIs 106-1, 106-2, . . . , 106-N (referred to generally herein as "VCIs 106"). The VCIs can be provisioned with processing resources 108 and/or memory resources 110 and can communicate via the network interface 112. The processing resources 108 and the memory resources 110 provisioned to the VCIs 106 can be local and/or remote to the host 102 (e.g., the VCIs 106 can be ultimately executed by hardware that may not be physically tied to the VCIs 106). For example, in a software defined data center, the VCIs 106 can be provisioned with resources that are generally available to the software defined data center and are not tied to any particular hardware device. By way of example, the memory resources 110 can include volatile and/or non-volatile memory available to the VCIs 106. The VCIs 106 can be moved to different hosts (not specifically illustrated), such that a different hypervisor manages the VCIs 106. In some embodiments, the host 102 can be connected to (e.g., in communication with) a containerized workload analyzer agent 114, which can be deployed on a VCI 106.

The VCIs 106-1, . . . , 106-N can include one or more containers (e.g., containers 220 illustrated in FIG. 2, herein), which can have a containerized workload (e.g., the containerized workloads 222 illustrated in FIG. 2, herein), such as a microservice, running thereon. The containerized workloads can correspond to one or more applications or portions of applications executed by the VCIs 106 and/or the host 102. The application may be configured to perform certain tasks and/or functions for the VCIs 106 and/or the host 102. By executing the application using multiple containerized workloads, scalability and/or portability of applications may be improved in comparison to approaches in which applications are monolithic.

In some embodiments, information generated by, or determined by, the containerized workload analyzer agent 114 can be used to schedule and/or coordinate container and/or containerized workload deployment across the VCIs 106, as described in more detail, herein. In some embodiments, the containerized workload analyzer agent 114 can be deployed on (e.g., may be running on) the host 102, and/or one or more of the VCIs 106. As used herein, an "agent" is a computing component configured to run at least one piece of software that is configured to perform actions without additional outside instruction. For example, an agent can be configured to execute instructions using computing resources, such as hardware, that can be available to the agent in the pool of computing resources.

Figure 3:
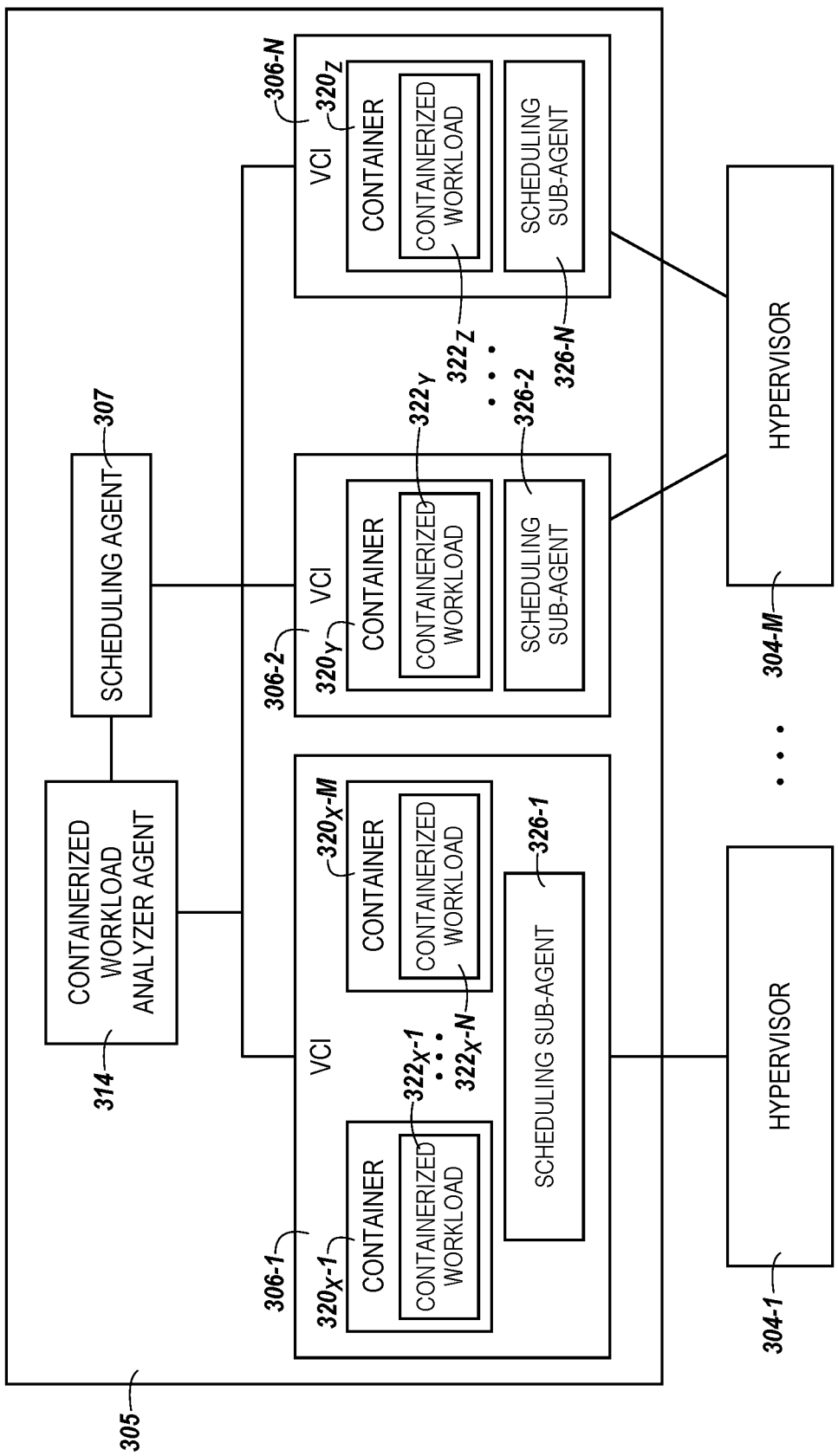
FIG. 3 is a diagram of a system including a scheduling agent, virtual computing instances, and hypervisors for containerized workload scheduling according to the present disclosure.

As described in more detail herein, the information generated by, or determined by, the containerized workload analyzer agent 114 can be used to schedule container and/or containerized workload deployment for the VCIs 106, the host 102, and/or a computing cluster (e.g., the virtual computing cluster (VCC) 305 illustrated in FIG. 3) in which the VCIs 106 and/or containers are deployed. For example, the information generated by or determined by the containerized workload analyzer agent 114 can be provided to a scheduling agent, such as the scheduling agent 307 illustrated in FIGS. 3A and 3C, herein to schedule container and/or containerized workload deployment. Non-limiting examples of a scheduling agent can include a container scheduler such as KUBERNETES®, DOCKER SWARM®, MESOS®, etc.

In some embodiments, the containerized workload analyzer agent 114 can include a combination of software and hardware, or the containerized workload analyzer agent 114 can include software and can be provisioned by processing resource 108. The containerized workload analyzer agent 114 can monitor containerized workloads originating from the VCIs 106. The containerized workload analyzer agent 114 can determine affinities between containerized workloads, VCIs 106, and/or the hypervisor 104 that correspond to communication patterns between containerized workloads and/or the VCIs 106 or hypervisors 104 on which the containerized workloads are running. For example, the containerized workload analyzer agent 114 can determine communication patterns between containerized workloads and/or the VCIs 106 or hypervisors 104 on which the containerized workloads are running and use the determined communication patterns to schedule execution of subsequent containerized workloads such that the subsequently scheduled containerized workloads are co-located on VCIs 106 and/or a hypervisor 104 on which containerized workloads that exhibit interactions and/or communication patterns therebetween are running.

In some embodiments, the containerized workload analyzer agent 114 can assign weights between containerized workloads that exhibit interactions and/or communication patterns therebetween based on monitored traffic flows between the containerized workloads (or the VCIs 106 or hypervisor 104 on which the containerized workloads are running). For example, the containerized workload analyzer agent 114 can monitor application programming interface (API) calls between the containerized workloads to determine affinities between containerized workloads that exhibit particular interactions and/or communication patterns. In some embodiments, the containerized workload analyzer agent 114 can monitor a volume of API calls between containerized workloads that exhibit particular communication patterns to determine the affinities between the containerized workloads. Based on the determined affinities, the containerized workload analyzer agent 114 can, over time, learn patterns between containerized workloads and use the patterns to schedule subsequent containerized workloads, and/or containers to run the subsequent containerized workloads. Additional examples of the containerized workload analyzer agent 114 are illustrated and described in more detail with respect to FIGS. 2 and 3, herein.

In some embodiments, the containerized workload analyzer agent 114 may be referred to as an "apparatus," and can be configured to monitor network traffic between a plurality of containerized workloads running on a plurality of nodes to determine affinities between the plurality of containerized workloads, generate respective node assignment scores for the plurality of containerized workloads based, at least, in part, on the monitored network traffic, and schedule execution of a containerized workload based, at least in part, on the respective node assignment scores, as described in more detail, herein.

In some embodiments, the affinities can be based, at least in part, on a determined weighted traffic pattern corresponding to containerized workloads among the plurality of containerized workloads. Embodiments are not so limited, however, and in some embodiments, the affinities can be based, at least in part, on a determined type of containerized workload running on one or more nodes among the plurality of nodes.

As described in more detail, herein, the containerized workload analyzer agent 114 can, in some embodiments, be configured to schedule deployment of a container to run the containerized microservice on a node having the highest node assignment score among the nodes. Embodiments are not so limited, however, and in some embodiments, the containerized workload analyzer agent 114 can be configured to schedule execution of the containerized workload on a node that is the same as a node on which a containerized workload that has a similar affinity to the containerized workload is executed.

Figure 2:
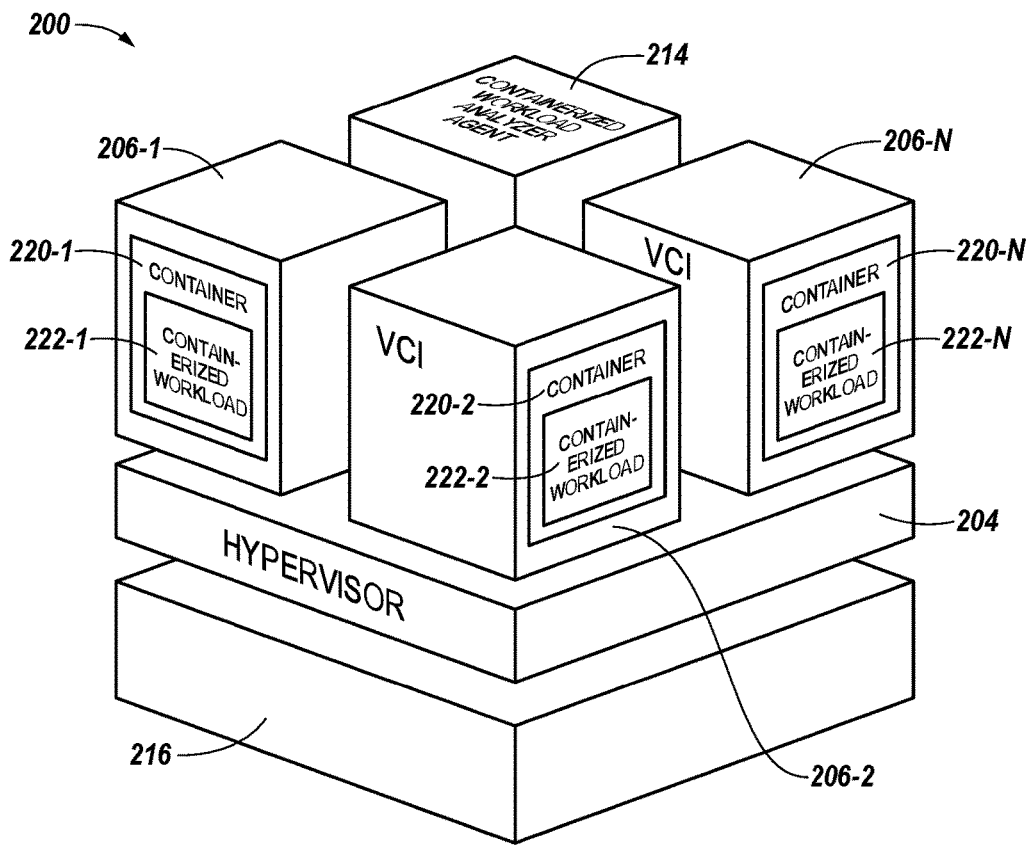
FIG. 2 is a diagram of a simplified system for containerized workload scheduling according to the present disclosure.

FIG. 2 is a diagram of a simplified system 200 for containerized workload scheduling according to a number of embodiments of the present disclosure. The system 200 can include a pool of computing resources 216, a plurality of VCIs 206-1, 206-2, . . . , 206-N, a containerized workload analyzer agent 214, and/or a hypervisor 204. The containerized workload analyzer agent 214 can, in some embodiments, be analogous to the containerized workload analyzer agent 114 illustrated in FIG. 1, herein.

The system 200 can include additional or fewer components than illustrated to perform the various functions described herein. In some embodiments, the VCIs 206-1, 206-2, . . . , 206-N, and/or the containerized workload analyzer agent 214 can be deployed on the hypervisor 204 and can be provisioned with the pool of computing resources 216. However, embodiments are not so limited and, in some embodiments, the containerized workload analyzer agent 214 can be deployed on one or more VCIs, for example, as a distributed agent.

The pool of computing resources 216 can include physical computing resources used in a software defined data center, for example, compute, storage, and network physical resources such as processors, memory, and network appliances. The VCIs 206-1, 206-2, . . . , 206-N, can be provisioned with computing resources to enable functionality of the VCIs 206-1, 206-2, . . . , 206-N. In some embodiments, the system 200 can include a combination of hardware and program instructions that are configured to provision the VCIs 206-1, 206-2, . . . , 206-N using the pool of computing resources 216 in the software defined data center.

In some embodiments, the containerized workload analyzer agent 214 can cause the containers 220-1, . . . , 220-N to be deployed on the VCIs 206. For example, when a new container 220 is generated to, for example, run a containerized workload 222-1, . . . , 222-N, the containerized workload analyzer agent 214 can select a VCI (e.g., VCI 206-1) on which to deploy the container (e.g., the container 220-1). As part of selecting the VCI 206 on which to deploy the container 220, the containerized workload analyzer agent 214 can monitor network traffic (e.g., containerized workloads 222) originating from containers 220 deployed on the VCIs 206 to determine affinities between the containerized workloads that have certain characteristics associated therewith. Examples of the characteristics associated with the network traffic originating from the containers 220 can include interactions and/or communication patterns between the containerized workloads 222, a likelihood that a subsequent containerized workload 222 will exhibit particular interactions and/or communication patterns with a different containerized workload 222, an amount of time the network traffic has run or will run, an amount of bandwidth consumed by the network traffic, an amount of data associated with the network traffic, and whether the network traffic corresponds to an elephant flow or a mouse flow, among other characteristics. The data traffic can be classified based on the size of flows corresponding to the data traffic. Herein, data traffic corresponding to a small flow, which may be referred to as a "mouse flow" or "mice flows" in the plural can include flows that are approximately 10 kilobytes in size or less, while data traffic corresponding to a large flow, which may be referred to as an "elephant flow" or "elephant flows in the plural can include flows that are approximately 10 kilobytes in size or greater. Embodiments are not limited to these specific byte sizes, however, and generally speaking, mouse flows are flows that contain at least one order of magnitude fewer kilobytes than elephant flows. In some embodiments, the network traffic monitored by the containerized workload analyzer agent 214 can include network traffic corresponding to execution of containerized workloads on the containers 220.

The containerized workload analyzer agent 214 can, in some embodiments, assign a rating or score to a containerized workload 222 based, at least in part, on the determination that the flow corresponding to the containerized workload 222 originating from the computing instance (e.g., a VCI 206) exhibits one or more of the characteristics above (e.g., exhibits particular affinities, has a threshold likelihood of incurring a dependency on a different containerized workload, etc.). For example, the containerized workload analyzer agent 214 can assign a rating or score (e.g. generate and/or store information that identifies affinities between containerized workloads) to containerized workloads 222 that exhibit particular affinities, such as particular communication patterns between other containerized workloads 222. The containerized workload analyzer agent 214 can transfer the scores and/or ratings to a scheduling agent (e.g., the scheduling agent 307 illustrated in FIG. 3) for use in scheduling execution of containers 220 to run subsequent containerized workloads 222. For example, the containerized workload analyzer agent 214 can provide information corresponding to the determined affinities between the containerized workloads 222 to be used as part of an operation to schedule execution of containers 220 and/or containerized workloads 222 on VCIs 206 such that the containerized workloads 222 are co-located on VCIs 206 and/or hypervisor(s) 204 that have containerized workloads 222 that exhibit particular interactions and/or communication patterns with other containerized workloads 222 running thereon.

FIG. 3 is a diagram of a system including a scheduling agent 307, virtual computing instances 306, and hypervisors 304 for containerized workload scheduling according to the present disclosure. As shown in FIG. 3A, the system includes a scheduling agent 307, a containerized workload analyzer agent 314, a plurality of VCIs 306-1, . . . , 306-N, and a plurality of hypervisors 304-1, . . . , 304-M. The plurality of VCIs 306 can include respective containers 320 (e.g., containers $320_X$-1, . . . , $320_X$-M, $320_Y$, $320_Z$, etc.), which can run respective containerized workloads 322 (e.g., containerized workloads $322_X$-1, . . . , $322_X$-M, $322_Y$, $322_Z$, etc.). In addition, the respective VCIs 306 can include respective scheduling sub-agents 326-1, 326-2, . . . , 326-N. Although the configuration shown in FIG. 3 makes particular reference to virtual computing clusters and software defined data centers, it will be appreciated that aspects of the present disclosure could be performed using a bare metal server. A bare metal server is a single tenant physical server. For example, the containerized workload analyzer agent 314 could, in some embodiments, be deployed or executed on a bare metal server to achieve containerized workload scheduling as described herein.

Non-limiting examples of scheduling sub-agents 326 can include KUBELETS®, among other scheduling sub-agents, that may be deployed on the VCIs 306 to communicate resource information, network state information, and/or containerized workload affinity information (e.g., information corresponding to affinities between containerized workloads 322) corresponding to the VCIs 306 and/or hypervisors 304 on which they are deployed to the containerized workload analyzer agent 314 and/or the scheduling agent 307. The VCIs 306 and hypervisors 304 illustrated in FIG. 3 can, in some embodiments, be part of a cluster 305 (e.g., a virtual computing cluster (VCC)). Although shown as separate agents, in some embodiments, the scheduling agent 307 can be included within the containerized workload analyzer agent 314.

As shown in FIG. 3, the cluster 305 (e.g., the VCC) can include a plurality of virtual computing instances (VCIs) 306 provisioned with a pool of computing resources (e.g., processing resources 108 and/or memory resources 110 illustrated in FIG. 1, herein) and ultimately executed by hardware. In some embodiments, at least a first VCI (e.g., the VCI 306-1) is deployed on a first hypervisor (e.g., the hypervisor 304-1) of the cluster 305 and at least a second VCI (e.g., the VCI 306-2) is deployed on a second hypervisor (e.g., the hypervisor 304-M) of the cluster 305. The VCIs 306 can have containers 320 deployed thereon.

Although the VCI 306-1 is shown as having a plurality of containers deployed thereon (e.g., the containers $320_X$-1, . . . , $320_X$-N) and the other VCIs 306-2 and 306-N are illustrated as having a single container deployed thereon (e.g., the containers $320_Y$ and $320_Z$), embodiments are not so limited and the VCIs 306 can include a greater or lesser number of containers based on the resources available to the respective VCIs 306. The containers 320 can have one or more containerized workloads 322 (e.g., microservices) running thereon, as described in more detail below.

The containers 320 can be configured to run containerized workloads 322 as part of providing an application to be executed by the containerized workload analyzer agent 314, the scheduling agent 307 and/or the VCIs 306. As described above, containerized workloads 322 can include instructions corresponding to modularized, containerized portions of an application. Containers 320 that are running containerized workloads 322 can be "short lived" due to the nature of the containerized workloads. For example, the containers 320 that are running containerized workloads 322 may only be in existence for a short period (e.g., seconds to minutes) of time, and may be destroyed after the containerized workload 322 running thereon is no longer useful or needed. In some embodiments, the containers 320 that are running containerized workloads 322 may be destroyed after the containerized workload 322 running thereon has been executed and/or the application that was using the containerized workload 322 has been executed.

As a result, the containerized workloads 322 can, in some embodiments, affect overall system latency if execution of the containerized workloads 322 are not scheduled effectively. In some approaches, containerized workloads 322 may be scheduled (e.g., by the scheduling agent 307) based solely on resource consumption associated with the VCIs 306 on which the containers 320 intended to run the containerized workloads 322 are deployed. However, by only taking the resource consumption of the VCIs 306 into account when scheduling execution of the containerized workloads 322, other network parameters that can affect the latency of the containerized workloads 322 (or the application that depends on the microservices) may not be taken into account when scheduling execution of the containerized workloads. This can result in degraded system and/or application performance. For example, affinities between containerized workloads 322 can affect the performance of the system and/or application. Embodiments herein can alleviate or mitigate effects that can lead to degraded system and/or application performance in comparison to approaches in which containerized workloads 322 are not monitored and/or the affinities therebetween are not taken into account. Such improvements can be achieved, for example, by monitoring containerized workloads 322 to determine affinities between the containerized workloads 322 and scheduling subsequent containers 320 and/or containerized workloads 322 such that they are co-located on VCIs 306 and/or hypervisors 304 that are running containerized workloads 322 that exhibit particular interactions and/or communication patterns with other containerized workloads 322.

Although not explicitly shown in FIG. 3 so as to not obfuscate the illustration, in some embodiments, the containerized workload analyzer agent 314 may be deployed on one or more VCIs 306 or on one or more hypervisors 304 in the cluster 305 (e.g., the VCC). The containerized workload analyzer agent(s) 314 can periodically or continually collect information such as traffic flow characteristics corresponding to execution of containerized workloads 322 on containers 320 deployed in the cluster 305. The traffic flow characteristics can include affinities between the containerized workloads 322, an amount of time it has taken or will take to execute containerized workloads 322, an amount of data associated with the containerized workloads 322, etc. Based on the collected information corresponding to the traffic flow characteristics of the containerized workloads 322, the containerized workload analyzer agent 314 can generate and assign a rating and/or score to particular containerized workloads 322. The containerized workload analyzer agent 314 can cause subsequently executed containerized workloads to be deployed on containers 320 and/or VCIs 306 such that the subsequently executed containerized workloads 322 are co-located on VCIs 306 and/or hypervisors 304 that are running containerized workloads 322 that exhibit particular interactions and/or communication patterns with other containerized workloads 322.

By scheduling containers 320 and/or containerized workloads 322 such that containerized workloads that exhibit affinities therebetween are co-located on a same VCI 306 and/or hypervisor 304, the containerized workload analyzer agent 314 can control traffic flow deployment in the cluster 305 in a manner that improves the performance of the VCIs 306, the containers 320, the containerized workloads 322, and/or the cluster 305. For example, by scheduling containers 320 and/or containerized workloads 322 such that containerized workloads that exhibit affinities therebetween are co-located on a same VCI 306 and/or hypervisor 304, containers 320 and/or containerized workloads 322 that are scheduled by the containerized workload analyzer agent 314 can enjoy reduced latencies in comparison to containers 320 and/or containerized workloads 322 that are slapdashedly scheduled in the cluster 305, as is commonplace in some approaches.

In some embodiments, the scheduling agent 307 can access the information corresponding to the containerized workloads 322 that is generated and/or stored by the containerized workload analyzer agent 314 as part of an operation to schedule container 320 deployment and/or containerized workload 322 execution. For example, the scheduling agent 307 can receive information from the containerized workload analyzer agent 314 that corresponds to affinities between the containerized workloads 322. The information can be based on a quantity of API calls between the containerized workloads 322, a duration of time for which the containerized workloads 322 will be executed (e.g., whether the containerized workloads are short lived or long lived), which containerized workloads 322 are running on which VCIs 306 or hypervisors 304, etc. In some embodiments, the information can include weighted interactions between the containerized workloads 322, as described in more detail in connection with FIG. 4, herein. Embodiments are not so limited, however, and the information can, in addition to, or in the alternative, include ratings or scores generated by the containerized workload analyzer 314 for the containerized workloads 322, the VCIs 306, and/or the hypervisors 304.

In some embodiments, the containerized workload analyzer agents 314 can collect statistics corresponding to interference from non-container VCIs co-located on hypervisors 304 where VCIs 306 are running a container 320. For example, in public cloud deployments, the containerized workload analyzer agents 314 can detect interference from non-containerized resources that may be consuming VCI 306 resources that the scheduling agent 307 may not be able to detect. In some embodiments, non-container VCIs are VCIs that do not have any containers deployed thereon and are instead running traditional workloads. By using this information, container and/or containerized workload scheduling may be improved in comparison to approaches in which a scheduling agent 307 is unable to detect interference from non-containerized resources running on the VCIs 306. Non-containerized workloads can include traditional workloads such as public cloud, hypervisor deployed workloads, and/or VCIs deployed on shared hypervisors.

In some embodiments, when a cluster 305 (e.g., a VCC) is generated, the containerized workload analyzer agent 314 can periodically (or continually) collect information (e.g., data and/or statistics) corresponding to the network traffic incurred as a result of calls between the containerized workloads 322 running in the cluster, as described above, and determine affinities between the containerized workloads 322. The containerized workload analyzer agents 314 can forward the information corresponding to the affinities to the scheduling sub-agents 326-1, . . . , 326-N on the VCIs 306. In some embodiments, the containerized workload analyzer agent 314 can periodically forward the information and/or tags at set or configurable time intervals. In one non-limiting example, the containerized workload analyzer agent 314 can forward the information and/or tags to the scheduling sub-agents 326 every few or tens of milliseconds (e.g., every 30 milliseconds, etc.). Embodiments are not so limited, however, and in some embodiments, the containerized workload analyzer agent 314 can forward the information corresponding to the affinities to the scheduling sub-agents 326 in response to a detection that a threshold change has occurred in the information corresponding to the affinities since the last information and/or scores were sent to the scheduling sub-agents 326.

In some embodiments, the containerized workload analyzer agent 314 can assign weights between the containerized workloads 322 based on the determined affinities. The containerized workload analyzer agent 314 can also use the generated weights to assign ratings and/or scores to the VCI2 306 and/or the hypervisors 304 for use in scheduling subsequent containerized workloads 322. For example, if the containerized workload analyzer agent 314 determines that an affinity exists between a containerized workload $322_X$-1 running on the VCI 306-1 and a containerized workload $322_Y$ running on the VCI 306-2, the containerized workload analyzer agent 314 can schedule execution of the containerized workload 322Y on the VCI 306-1.

The containerized workload analyzer agent 314 can advertise or forward the information and/or tags to the scheduling agent 307. In some embodiments, the containerized workload analyzer agent 314 can advertise the information and/or ratings/scores to the scheduling agent 307 via an application programming interface (API) call, or the scheduling sub-agents 326 can forward the information and/or tags to the scheduling agent 307 periodically or in response to receipt of the information and/or ratings/scores from the containerized workload analyzer agent 314.

If a new container 320 is to be created, the containerized workload analyzer agent 314 and/or the scheduling agent 307 can determine on which VCI 306 to schedule the container 320 deployment based on resources available to the VCIs 306 in addition to the affinity information, ratings, and/or scores. By including the affinity information, ratings, and/or scores in the calculus performed by the scheduling agent 307 in addition to the resources available to the VCIs 306 when scheduling deployment of new containers 320, performance of containerized workloads 322 and the applications that depend on the containerized workloads 322 can be improved in comparison to approaches in which only the resources available to the VCIs 306 are taken into account. In addition, because the affinity information, ratings, and/or scores can be asynchronously (e.g., intermittently) sent by the containerized workload analyzer agent 314, delays in network traffic may be further mitigated in comparison to some approaches.

Figure 4:
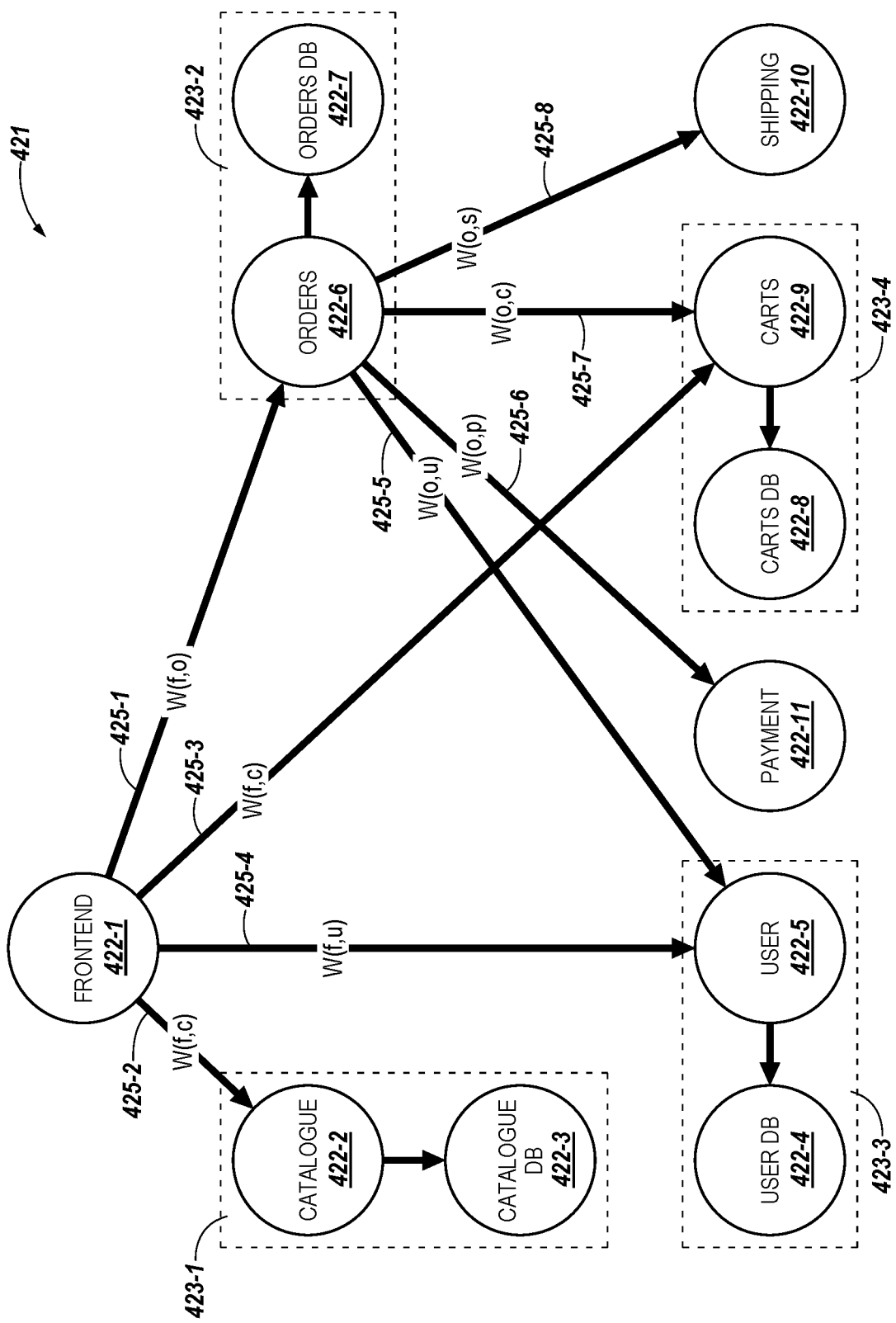
FIG. 4 is a diagram representing affinities between a plurality of containerized workloads according to the present disclosure.

FIG. 4 is a flow diagram 421 representing affinities between a plurality of containerized workloads 422-1, . . . , 422-11 according to the present disclosure. It will be understood that the example shown in FIG. 4 and discussed in connection therewith below is for illustrative purposes and is not to be construed as a limiting example of the present disclosure. It will be appreciated that FIG. 4 represents a scaled down and simplified example that may not fully express the interconnected relationship of the containerized workloads in a real virtual computing environment.

As shown in FIG. 4, a plurality of containerized workloads 422-1, . . . , 422-11 are in communication with one another. Certain containerized workloads 422 are grouped into static (e.g., known) dependencies, as indicated by the dashed boxes 423-1, 423-2, 423-3, and 423-4. In FIG. 4, communication patterns (e.g., interactions between containerized workloads 422 that change over time and/or in response to input from a user) are indicated by the arrows 425-1, . . . , 425-8, with corresponding weights indicated using the notation $W(\Omega,\Psi)$, where $\Omega$ corresponds to a containerized workload that interacts with, or exhibits a particular communication pattern with another containerized workload, $\Psi$. For example, the weight $W(f,u)$ corresponds to a weight assigned between a containerized workload corresponding to a frontend service that that interacts with or that exhibits particular communication patterns with a containerized workload corresponding to a user service.

In the non-limiting example illustrated in FIG. 4, a "frontend" containerized workload 422-1 can exhibit interactions and/or communication patterns with a "catalogue" containerized workload 422-2, which can exhibit a static dependency on a catalogue database ("catalogue DB") containerized workload 422-2. The frontend containerized workload 422-1 can exhibit particular interactions and/or communication patterns with a "user" containerized workload 422-5, which can exhibit a static dependency on a user database ("user DB") containerized workload 422-4. The frontend containerized workload 422-1 can further exhibit interactions and/or communication patterns with an "orders" containerized workload 422-6, which can exhibit a static dependency on an orders database ("orders DB") containerized workload 422-7. The frontend containerized workload 422-1 can exhibit a further exhibit interactions and/or communication patterns with a "carts" containerized workload 422-9, which can exhibit a static dependency on a carts database ("carts DB") containerized workload 422-8. Further, as shown in FIG. 4, the orders containerized workload 422-6 can exhibit interactions and/or communication patterns with the user containerized workload 422-5, a "payment" containerized workload 422-11, the carts containerized workload 422-9, and/or a "shipping" containerized workload 422-10.

In the example shown in FIG. 4, when a user visits a website, the frontend containerized workload 422-1 may be executed. The user may have an account with the proprietor of the website, and may log into said account, at which point the user containerized workload 422-5 can be executed. If the website offers goods for sale, the user may examine such goods, which can cause the catalogue containerized workload 422-2 to be executed. The user may initiate an order of a good, which can cause the orders containerized workload 422-6 to be executed. Once the user has decided to purchase the good, the good may be placed in a virtual shopping cart, at which point the carts containerized workload 422-9 can be executed. To complete the order, the user may be required to enter payment information and/or shipping information, which can cause execution of the payment containerized workload 422-11 and/or the shipping containerized workload 422-10.

While the user is enjoying the online shopping experience, affinities between the containerized workloads 422 may be monitored and information corresponding to the affinities may be collected and/or analyzed. In some embodiments, the monitored affinities and/or information corresponding to the affinities may be collected and/or analyzed by an agent such as the containerized workload analyzer agent 114/214/314 illustrated in FIGS. 1-3, herein. The monitored affinities and/or information corresponding to the affinities may be collected and/or analyzed over time based on multiple user actions such that an aggregate of the monitored affinities and/or information corresponding to the affinities may be determined. In some embodiments, the aggregate of the monitored affinities and/or information corresponding to the affinities may then be used to facilitate containerized workload scheduling as described herein.

In some embodiments, the monitored affinities and/or information corresponding to the affinities may be used to assign values to the weights 425 illustrated in FIG. 4. For example, if, based on the monitored affinities and/or collected or analyzed information corresponding to the affinities, the containerized workload analyzer agent determines that 90% of the time after the frontend containerized workload 422-1 is executed, the user containerized workload 422-5 is subsequently executed, but the orders containerized workload 422-6 is only executed 10% of the time after the frontend containerized workload 422-1 is executed, a higher weight may be assigned to the $W(f,u)$ affinity than the $W(f,o)$ affinity. In another example, if, based on the monitored affinities and/or collected or analyzed information corresponding to the affinities, the containerized workload analyzer agent determines that 60% of the time after the orders containerized workload 422-6 is executed, the user containerized workload 422-5 is subsequently executed, but the payment containerized workload 422-11 is executed 40% of the time after the orders containerized workload 422-6 is executed, a higher weight may be assigned to the $W(o,u)$ affinity than the $W(o,p)$ affinity.

In some embodiments, the containerized workloads 422 may be rated, scored, and/or ranked based on the assigned weights therebetween. For example, the containerized workload analyzer agent can, in some embodiments, assign ratings, scores, and/or ranking to pairs of containerized workloads 422 that interact with one another or that exhibit particular communication patterns based on the assigned weights. In this manner, the containerized workload analyzer agent can learn the behavior of the containerized workloads 422 that interact with one another or that exhibit particular communication patterns over time and can schedule subsequent containerized workloads 422 such that higher ranked (e.g., containerized workloads 422 that exhibit heavy weights 425 therebetween) are co-located on a same VCI or hypervisor.

Continuing with the above example, the containerized workload analyzer agent may attempt to schedule a user containerized workload 422-6 on a same VCI or hypervisor as the frontend containerized workload 422-1 because the weight, $W(f,u)$ is relatively heavy in comparison to the weight, $W(f,o)$ between the frontend containerized workload 422-1 and the user containerized workload 422-5. Similarly, the containerized workload analyzer agent may attempt to schedule a user containerized workload 422-5 on a same VCI or hypervisor as the orders containerized workload 422-6 because the weight, $W(o,u)$ is relatively heavy in comparison to the weight, $W(o,p)$ between the user containerized workload 422-6 and the payment containerized workload 422-11.

In another non-limiting example in which the containerized workload analyzer agent monitors affinities and/or information corresponding to the affinities to assign values to the weights 425 illustrated in FIG. 4, the containerized workload analyzer agent may determine that 60% of the time after the frontend containerized workload 422-1 is executed, the catalogue containerized workload 422-2 is executed. In addition, the containerized workload analyzer agent may determine that that 25% of the time after the frontend containerized workload 422-1 is executed, the user containerized workload 422-5 is executed, that 10% of the time after the frontend containerized workload 422-1 is executed, the orders containerized workload 422-6 is executed, and that 5% of the time after the frontend containerized workload 422-1 is executed, the carts containerized workload 422-9 is executed. In some embodiments, the containerized workloads 422 may be rated, scored, and/or ranked based on the assigned weights therebetween.

For example, after the containerized workload analyzer agent has determined the relative weights for each of the containerized workloads 422 that interact with one another or that exhibit particular communication patterns, the containerized workload analyzer agent can, in some embodiments, assign ratings to each of the containerized workload that interact with one another or that exhibit particular communication patterns. For example, the containerized workload analyzer agent may assign a highest rating to the affinity W(f,c) between the frontend containerized workload 422-1 and the catalogue containerized workload 422-2, a second highest rating to the W(f,u) affinity between the frontend containerized workload 422-1 and the user containerized workload 422-6, a third highest rating to the W(f,o) affinity between the frontend containerized workload 422-1 and the orders containerized workload 422-6, and a lowest rating to the W(f,c) affinity between the frontend containerized workload 422-1 and the carts containerized workload 422-9. These ratings may then be used to schedule execution of subsequent containerized workloads and/or containers such that they are co-located on a same VCI or hypervisor. For example, the containerized workload analyzer agent may schedule a catalogue containerized workload 422-2 on a same VCI or hypervisor as the frontend containerized workload 422-1 based on the rating.

In some embodiments, after the containerized workload analyzer agent has determined the relative weights for each of the containerized workloads 422 that interact with one another or that exhibit particular communication patterns, the containerized workload analyzer agent can, in some embodiments, assign scores to each of the containerized workload relationships. For example, the containerized workload analyzer agent may assign a score of 10 (on a 1-10 scoring scale with 10 being the "best" and 1 being the "worst") to the affinity W(f,c) between the frontend containerized workload 422-1 and the catalogue containerized workload 422-2, a score of 6 to the W(f,u) affinity between the frontend containerized workload 422-1 and the user containerized workload 422-6, a score of 3 to the W(f,o) affinity between the frontend containerized workload 422-1 and the orders containerized workload 422-6, and a score of 1 to the W(f,c) affinity between the frontend containerized workload 422-1 and the carts containerized workload 422-9. These scores may then be used to schedule execution of subsequent containerized workloads and/or containers such that they are co-located on a same VCI or hypervisor. For example, the containerized workload analyzer agent may schedule a catalogue containerized workload 422-2 on a same VCI or hypervisor as the frontend containerized workload 422-1 based on the assigned scores. It will be appreciated that any scoring system may be used and embodiments are not limited to the 1-10 scoring system described above.

Embodiments are not so limited, however, and in some embodiments, the assigned weights, ratings, scores, and/or rankings can be used to execution of subsequent containers when one or more containerized workloads are horizontally scaled up. For example, when containerized workloads corresponding to an application are scaled up due to, for example, increased traffic that corresponds to particular containerized workloads, containers to run the subsequent containerized workloads can be scheduled for deployment based on the assigned weights, ratings, scores, and/or rankings.

Figure 5A:
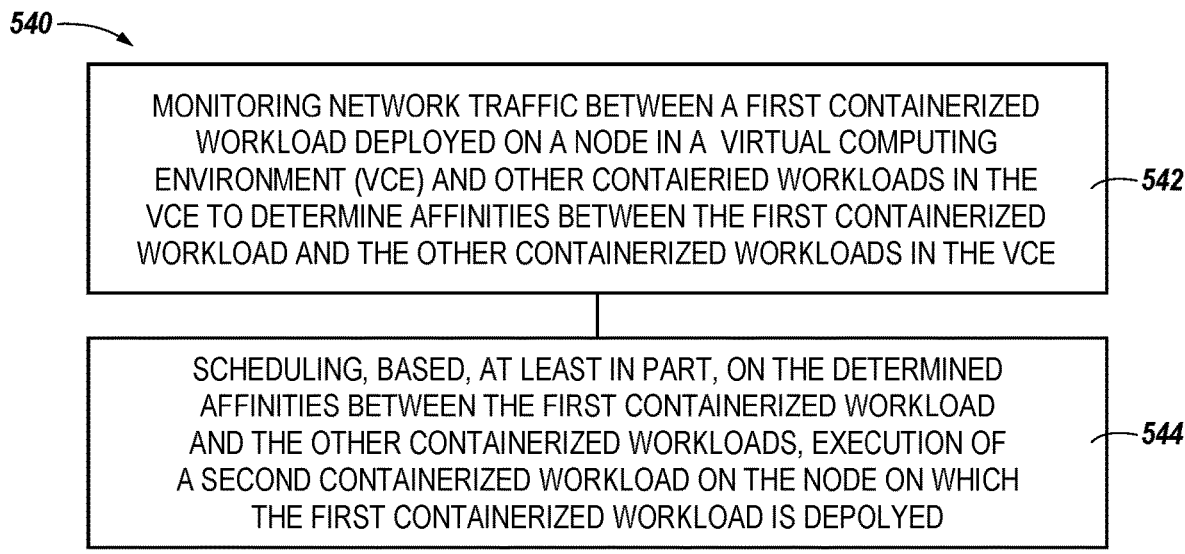
FIG. 5A is a flow diagram representing a method for containerized workload scheduling according to the present disclosure.

FIG. 5A is a flow diagram representing a method 540 for containerized workload scheduling according to the present disclosure. At block 542, the method 540 can include monitoring network traffic between a first containerized workload deployed on a node in a virtual computing environment to determine affinities between the first containerized workload and other containerized workloads in the virtual computing environment. In some embodiments, the affinities comprise information corresponding to other containerized workloads that are deployed on the node on which the first containerized workload is deployed, as described above. The first containerized workload and/or the second containerized workload can be analogous to the containerized workloads 222/322/422 illustrated in FIGS. 2-4, herein. The virtual computing environment can be analogous to the cluster 305 illustrated in FIG. 3, herein.

At block 544, the method 540 can include scheduling, based, at least in part, on the determined affinities between the first containerized workload and the other containerized workloads, execution of a second containerized workload on the node on which the first containerized workload is deployed. The node can be a VCI, such as the VCI(s) 106/206/306 illustrated in FIGS. 1-3, or the node can be a hypervisor, such as the hypervisor(s) 104/204/304 illustrated in FIGS. 1-3, herein.

In some embodiments, the method 540 can include assigning respective scores to the affinities between the first containerized workload and the other containerized workloads and/or scheduling execution of the container to run the second containerized workload based, at least in part, on the assigned scores. Embodiments are not so limited, however, and in some embodiments, the method 540 can include assigning weights to each of the affinities between the first containerized workload and the other containerized workloads and/or scheduling, based, at least in part, on the weights between the first containerized workload and the other containerized workloads, execution of a container to run a second containerized workload on the node on which the first containerized workload is deployed.

The method 540 can include scheduling based, at least in part, on the determined affinities between the first containerized workload and the other containerized workloads deployment of a container to run the second containerized workload on the node on which the first containerized workload is deployed. In some embodiments, the method 540 can further include scheduling, based, at least in part, on an amount of computing resources available to the node on which the first containerized workload is deployed, execution of the second containerized workload on the node on which the first containerized workload is deployed.

Figure 5B:
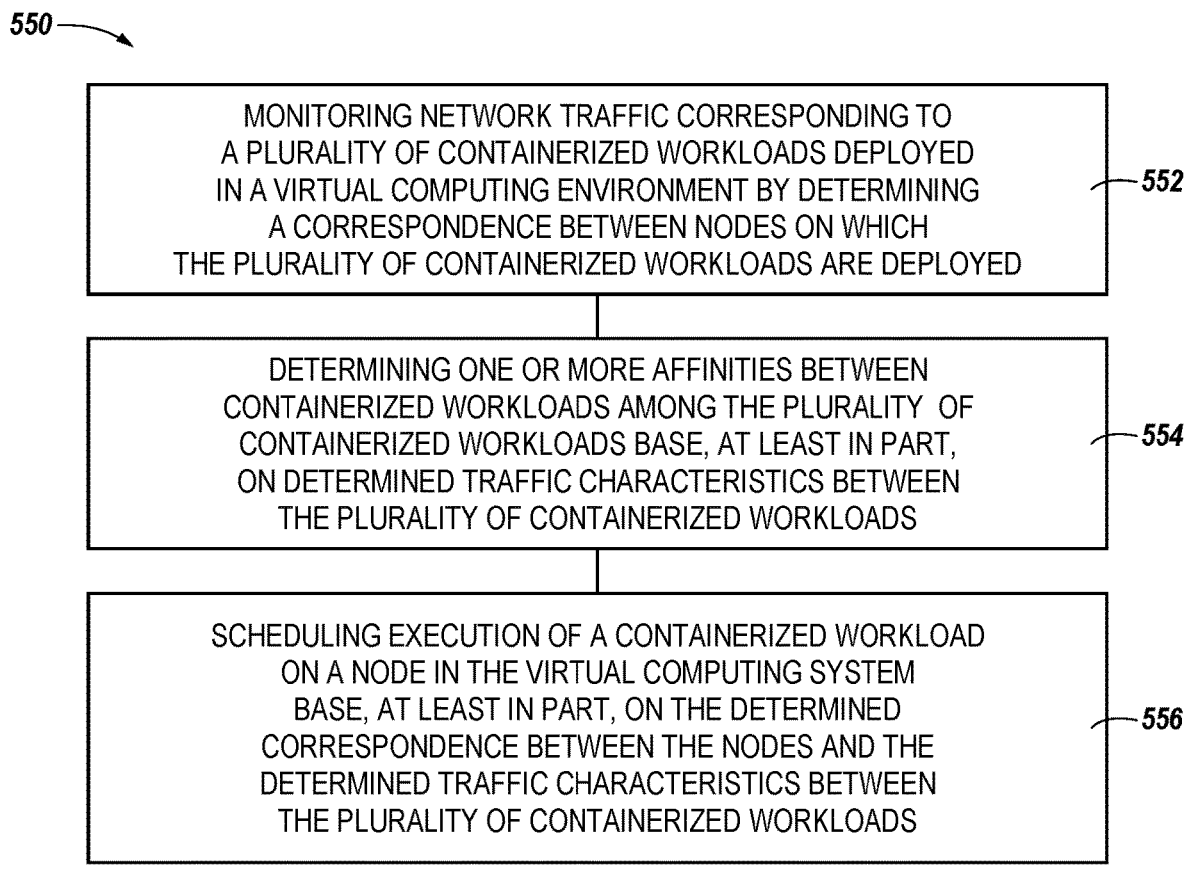
FIG. 5B is another flow diagram representing a method for containerized workload scheduling according to the present disclosure.

FIG. 5B is another flow diagram representing a method 550 for containerized workload scheduling according to the present disclosure. At block 552, the method 550 can include monitoring network traffic corresponding to a plurality of containerized workloads deployed in a virtual computing environment by determining a correspondence between nodes on which the plurality of containerized workloads are deployed.

At block 554, the method 550 can include determining one or more affinities between containerized workloads among the plurality of containerized workloads based, at least in part, on determined traffic characteristics between the plurality of containerized workloads.

At block 556, the method 550 can include scheduling execution of a containerized workload on a node in the virtual computing system based, at least in part, on the determined correspondence between the nodes and the determined traffic characteristics between the plurality of containerized workloads. The node can be a VCI, such as the VCI(s) 106/206/306 illustrated in FIGS. 1-3, or the node can be a hypervisor, such as the hypervisor(s) 104/204/304 illustrated in FIGS. 1-3, herein.

In some embodiments, the method 550 can include scheduling execution of the containerized workload on the node based, at least in part, on an amount of computing resources available to the node. For example, if a desired node does not have adequate computing resources to support an additional containerized workload, the method 550 may include scheduling execution of the containerized workload on a different node that has adequate computing resources available to support execution of the containerized workload.

The method 550 can include assigning respective scores to nodes in the virtual computing system based, at least in part, on the determined correspondence between the nodes and the determined traffic characteristics between the plurality of containerized workloads. In some embodiments, the method 550 can further include ranking the respective scores and/or scheduling execution of a second containerized workload on a node in the virtual computing system based, at least in part, on the ranked scores.

The method 550 can further include analyzing interactions between the plurality of containerized workload to determine correspondences between execution of the containerized workload and execution of a different containerized workload and/or scheduling execution of the second containerized workload on a node in the virtual computing system based, at least in part, on the analyzed interactions. In some embodiments, the method 550 can further include retrieving the determined correspondence between the nodes and the determined traffic characteristics between the plurality of containerized workloads from a localized cache available to a containerized workload analyzer agent deployed in the virtual computing system.

Figure 6:
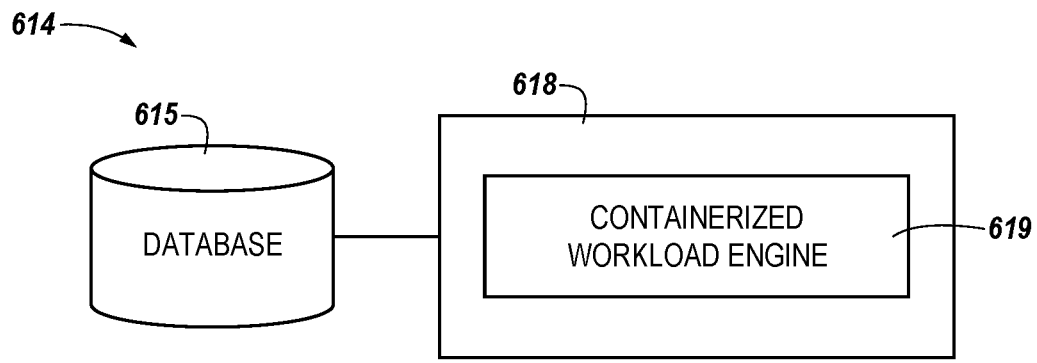
FIG. 6 is a diagram of a system for containerized workload scheduling according to the present disclosure.

FIG. 6 is a diagram of an apparatus for containerized workload scheduling according to the present disclosure. The apparatus 614 can include a database 615, a subsystem 618, and/or a number of engines, for example a containerized workload engine 619, and can be in communication with the database 615 via a communication link. The apparatus 614 can include additional or fewer engines than illustrated to perform the various functions described herein. The apparatus 614 can represent program instructions and/or hardware of a machine (e.g., machine 730 as referenced in FIG. 7, etc.). As used herein, an "engine" can include program instructions and/or hardware, but at least includes hardware. Hardware is a physical component of a machine that enables it to perform a function. Examples of hardware can include a processing resource, a memory resource, a logic gate, etc. In some embodiments, the apparatus 614 can be analogous to the containerized workload analyzer agent 114 illustrated and described in connection with FIG. 1, herein.

The engines (e.g., the containerized workload engine 619) can include a combination of hardware and program instructions that are configured to perform a number of functions described herein. The program instructions (e.g., software, firmware, etc.) can be stored in a memory resource (e.g., machine-readable medium) as well as hard-wired program (e.g., logic). Hard-wired program instructions (e.g., logic) can be considered as both program instructions and hardware.

The containerized workload engine 619 can include a combination of hardware and program instructions that can be configured to monitor a first containerized workload deployed on a node in a virtual computing environment to determine affinities between the first containerized workload and other containerized workloads in the virtual computing environment. In some embodiments, the containerized workload engine 619 can include a combination of hardware and program instructions that can be configured to determine the affinities between the first containerized workload and other containerized workloads in the virtual computing environment based, at least in part, on information corresponding to respective nodes on which the other containerized workloads are deployed.

Embodiments are not so limited, however, and in some embodiments, the containerized workload engine 619 can include a combination of hardware and program instructions that can be configured to determine the affinities between the first containerized workload and other containerized workloads in the virtual computing environment based, at least in part, on information corresponding to other containerized workloads that are deployed on the node on which the first containerized workload is deployed. Further, in at least one embodiment, the containerized workload engine 619 can include a combination of hardware and program instructions that can be configured to determine the affinities between the first containerized workload and other containerized workloads in the virtual computing environment based, at least in part on a determined correspondence between nodes on which the plurality of containerized workloads are deployed.

The containerized workload agent 619 can further include a combination of hardware and program instructions that can be configured to assign weights to each of the affinities between the first containerized workload and the other containerized workloads, and/or schedule, based, at least in part, on the weights between the first containerized workload and the other containerized workloads, execution of a container to run a second containerized workload on the node on which the first containerized workload is deployed. The node may be a VCI, such as the VCIs 106/206/306 described and illustrated in connection with FIGS. 1-3, and/or a hypervisor, such as the hypervisor 104/204/304 described and illustrated in connection with FIGS. 1-3, herein.

The containerized workload engine 619 can include a combination of hardware and program instructions that can be configured to assign respective scores to the affinities between the first containerized workload and the other containerized workloads and/or schedule execution of the container to run the second containerized workload based, at least in part, on the assigned scores, as described above. In some embodiments, the containerized workload engine 619 can include a combination of hardware and program instructions that can be configured to schedule execution of the second containerized workload on the node on which the first containerized workload is deployed based, at least in part, on an amount of computing resources available to the node on which the first containerized workload is deployed.

Figure 7:
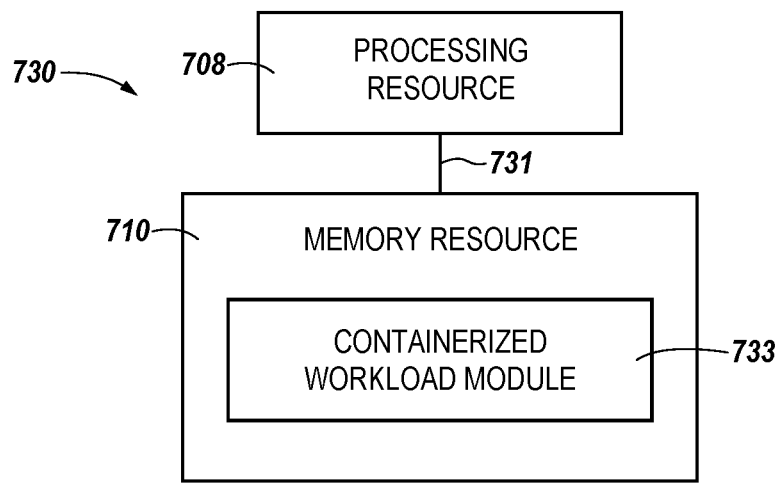
FIG. 7 is a diagram of a machine for containerized workload scheduling according to the present disclosure.

FIG. 7 is a diagram of a machine for containerized workload scheduling according to the present disclosure. The machine 730 can utilize software, hardware, firmware, and/or logic to perform a number of functions. The machine 730 can be a combination of hardware and program instructions configured to perform a number of functions (e.g., actions). The hardware, for example, can include a number of processing resources 708 and a number of memory resources 710, such as a machine-readable medium (MRM) or other memory resources 710. The memory resources 710 can be internal and/or external to the machine 730 (e.g., the machine 730 can include internal memory resources and have access to external memory resources). In some embodiments, the machine 730 can be a VCI, for example, the machine 730 can be a server. The program instructions (e.g., machine-readable instructions (MRI)) can include instructions stored on the MRM to implement a particular function (e.g., actions related to containerized workload scheduling as described herein). The set of MRI can be executable by one or more of the processing resources 708. The memory resources 710 can be coupled to the machine 730 in a wired and/or wireless manner. For example, the memory resources 710 can be an internal memory, a portable memory, a portable disk, and/or a memory associated with another resource, e.g., enabling MRI to be transferred and/or executed across a network such as the Internet. As used herein, a "module" can include program instructions and/or hardware, but at least includes program instructions.

Memory resources 710 can be non-transitory and can include volatile and/or non-volatile memory. Volatile memory can include memory that depends upon power to store information, such as various types of dynamic random-access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAIVI), magnetic memory, optical memory, and/or a solid-state drive (SSD), etc., as well as other types of machine-readable media.

The processing resources 708 can be coupled to the memory resources 710 via a communication path 731. The communication path 731 can be local or remote to the machine 730. Examples of a local communication path 731 can include an electronic bus internal to a machine, where the memory resources 710 are in communication with the processing resources 708 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path 731 can be such that the memory resources 710 are remote from the processing resources 708, such as in a network connection between the memory resources 710 and the processing resources 708. That is, the communication path 731 can be a network connection. Examples of such a network connection can include a local area network (LAN), wide area network (WAN), personal area network (PAN), and the Internet, among others.

As shown in FIG. 7, the MM stored in the memory resources 710 can be segmented into a number of modules, e.g., 733, that when executed by the processing resource(s) 708, can perform a number of functions. As used herein a module includes a set of instructions included to perform a particular task or action. The module(s) 733 can be sub-modules of other modules. Examples are not limited to the specific module(s) 733 illustrated in FIG. 7.

The module(s) 733 can include program instructions and/or a combination of hardware and program instructions that, when executed by a processing resource 708, can function as a corresponding engine as described with respect to FIG. 6. For example, the containerized workload module 733 can include program instructions and/or a combination of hardware and program instructions that, when executed by a processing resource 708, can function as the containerized workload engine 619.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for containerized workload scheduling, comprising:
monitoring network traffic between a first containerized workload deployed on a node in a virtual computing environment (VCE) and other containerized workloads in the VCE to determine affinities between the first containerized workload and the other containerized workloads in the VCE, wherein the affinities are based on information derived from the monitoring of the network traffic between the first containerized workload and the other containerized workloads that change over time, such that the affinities characterize dynamic communication patterns of the network traffic between the first containerized workload and the other containerized workloads in the VCE to assess inter-containerized workload interactions in real time; and
scheduling, based, at least in part, on the determined affinities characterizing the dynamic communication patterns of the network traffic between the first containerized workload and the other containerized workloads, subsequent execution of a second containerized workload on the node on which the first containerized workload is deployed;
wherein the network traffic comprises flows characterized by flow sizes, the flows being classified flow types based on the flow size as mouse flows or elephant flows, the affinities being associated with the flow types.

2. The method of claim 1, further comprising:
assigning respective scores to the affinities between the first containerized workload and the other containerized workloads; and
scheduling execution of the container to run the second containerized workload based, at least in part, on the assigned scores.

3. The method of claim 1, further comprising:
assigning weights to each of the affinities between the first containerized workload and the other containerized workloads; and
scheduling, based, at least in part, on the weights between the first containerized workload and the other containerized workloads, execution of a container to run a second containerized workload on the node on which the first containerized workload is deployed.

4. The method of claim 1, wherein the node comprises a virtual computing instance or a hypervisor.

5. The method of claim 1, further comprising scheduling based, at least in part, on the determined affinities between the first containerized workload and the other containerized workloads deployment of a container to run the second containerized workload on the node on which the first containerized workload is deployed.

6. The method of claim 1, further comprising scheduling, based, at least in part, on an amount of computing resources available to the node on which the first containerized workload is deployed, execution of the second containerized workload on the node on which the first containerized workload is deployed.

7. The method of claim 1, wherein the affinities comprise information corresponding to other containerized workloads that are deployed on the node on which the first containerized workload is deployed.

8. A method for containerized workload scheduling, comprising:
monitoring network traffic corresponding to a plurality of containerized workloads deployed in a virtual computing environment by determining a correspondence between nodes on which the plurality of containerized workloads are deployed;
determining one or more affinities between containerized workloads among the plurality of containerized workloads based, at least in part, on determined traffic characteristics of information derived from the monitoring of the network traffic between the plurality of containerized workloads that change over time, such that the affinities characterize dynamic communication patterns of the network traffic between the plurality of containerized workloads to assess inter-containerized workload interactions in real time; and
scheduling subsequent execution of a containerized workload on a node in the virtual computing system based, at least in part, on the determined correspondence between the nodes and the determined affinities characterizing the dynamic communication patterns of the network traffic between the plurality of containerized workloads based, at least in part, on the determined traffic characteristics of the information derived from the monitoring of the network traffic between the plurality of containerized workloads;
wherein the network traffic comprises flows characterized by flow sizes, the flows being classified flow types based on the flow size as mouse flows or elephant flows, the affinities being associated with the flow types.

9. The method of claim 8, further comprising scheduling execution of the containerized workload on the node based, at least in part, on an amount of computing resources available to the node.

10. The method of claim 8, further comprising assigning respective scores to nodes in the virtual computing system based, at least in part, on the determined correspondence between the nodes and the determined traffic characteristics between the plurality of containerized workloads.

11. The method of claim 10, further comprising: ranking the respective scores; and
scheduling execution of a second containerized workload on a node in the virtual computing system based, at least in part, on the ranked scores.

12. The method of claim 8, further comprising:
analyzing interactions between the plurality of containerized workload to determine correspondences between execution of the containerized workload and execution of a different containerized workload; and
scheduling execution of the different containerized workload on a node in the virtual computing system based, at least in part, on the analyzed interactions.

13. The method of claim 12, further comprising retrieving the determined correspondence between the nodes and the determined traffic characteristics between the plurality of containerized workloads from a localized cache available to a containerized workload analyzer agent deployed in the virtual computing system.

14. A non-transitory machine-readable medium storing instructions executable by a processing resource of a computing system to cause the computing system to:
monitor a first containerized workload deployed on a node in a virtual computing environment to determine affinities between the first containerized workload and other containerized workloads in the virtual computing environment, wherein the affinities are based on information derived from monitoring of network traffic between the first containerized workload and the other containerized workloads that change over time, such that the affinities characterize dynamic communication patterns of the network traffic between the first containerized workload and the other containerized workloads to assess inter-containerized workload interactions in real time;
assign weights to each of the affinities characterizing the dynamic communication patterns of the network traffic between the first containerized workload and the other containerized workloads, wherein the weights are based on the dynamic communication patterns of the network traffic between the first containerized workload and the other containerized workloads; and
schedule, based, at least in part, on the weights based on the dynamic communication patterns of the network traffic between the first containerized workload and the other containerized workloads, subsequent execution of a container to run a second containerized workload on the node on which the first containerized workload is deployed;
wherein the network traffic comprises flows characterized by flow sizes, the flows being classified flow types based on the flow size as mouse flows or elephant flows, the affinities being associated with the flow types.

15. The non-transitory machine-readable medium of claim 14, wherein the instructions are executable by the processing resource to cause the computing system to:

assign respective scores to the affinities between the first containerized workload and the other containerized workloads; and schedule execution of the container to run the second containerized workload based, at least in part, on the assigned scores.

16. The non-transitory machine-readable medium of claim 14, wherein the node comprises a virtual computing instance or a hypervisor.

17. The non-transitory machine-readable medium of claim 14, wherein the instructions are executable by the processing resource to cause the computing system to determine the affinities between the first containerized workload and other containerized workloads in the virtual computing environment based, at least in part, on information corresponding to respective nodes on which the other containerized workloads are deployed.

18. The non-transitory machine-readable medium of claim 14, wherein the instructions are executable by the processing resource to cause the computing system to determine the affinities between the first containerized workload and other containerized workloads in the virtual computing environment based, at least in part, on information corresponding to other containerized workloads that are deployed on the node on which the first containerized workload is deployed.

19. The non-transitory machine-readable medium of claim 14, wherein the instructions are executable by the processing resource to cause the computing system to schedule execution of the second containerized workload on the node on which the first containerized workload is deployed based, at least in part, on an amount of computing resources available to the node on which the first containerized workload is deployed.

20. The non-transitory machine-readable medium of claim 14, wherein the instructions are executable by the processing resource to cause the computing system to determine the affinities between the first containerized workload and other containerized workloads in the virtual computing environment based, at least in part on a determined correspondence between nodes on which the first containerized workload and the other containerized workloads are deployed.

21. An apparatus for containerized workload scheduling, the apparatus comprising:
a memory device; and
a hardware processor configured to execute:
a containerized workload analyzer agent configured to:
monitor network traffic between a plurality of containerized workloads running on a plurality of nodes to determine affinities between the plurality of containerized workloads, wherein the affinities are based on information derived from monitoring of the network traffic between the plurality of containerized workloads that change over time, such that the affinities characterize dynamic communication patterns of the network traffic between the plurality of containerized workloads to assess inter-containerized workload interactions in real time;
generate respective node assignment scores for the plurality of containerized workloads based, at least, in part, on the determined affinities characterizing the dynamic communication patterns of the network traffic between the plurality of containerized workloads of the monitored network traffic; and schedule subsequent execution of a containerized workload based, at least in part, on the respective node assignment scores based, at least, in part, on the determined affinities characterizing the dynamic communication patterns of the network traffic between the plurality of workloads of the monitored network traffic;
wherein the network traffic comprises flows characterized by flow sizes, the flows being classified flow types based on the flow size as mouse flows or elephant flows, the affinities being associated with the flow types.

22. The apparatus of claim 21, wherein the affinities are based, at least in part, on a determined weighted traffic pattern corresponding to containerized workloads among the plurality of containerized workloads.

23. The apparatus of claim 21, wherein the affinities are based, at least in part, on a determined type of containerized workload running on one or more nodes among the plurality of nodes.

24. The apparatus of claim 21, wherein the containerized workload analyzer agent is configured to schedule deployment of a container to run the containerized workload on a node having the highest node assignment score among the nodes.

25. The apparatus of claim 21, wherein the containerized workload analyzer agent is configured to schedule execution of the containerized workload on a node that is the same as a node on which a containerized workload that has a similar affinity to the containerized workload is executed.

26. A system for containerized workload scheduling, comprising:
a virtual computing cluster (VCC);
a plurality of virtual computing instances (VCIs) deployed within the VCC; and
a containerized workload analyzer agent deployed within the VCC that is provisioned with processing resources and ultimately executed by hardware, wherein the containerized workload analyzer agent is configured to:
monitor network traffic corresponding to a plurality of containerized workloads deployed in the VCC by determining a correspondence between nodes on which the plurality of containerized workloads are deployed;
determine one or more affinities between containerized workloads among the plurality of containerized workloads based, at least in part, on determined traffic characteristics of information derived from monitoring of the network traffic between the plurality of containerized workloads that change over time, such that the affinities characterize dynamic communication patterns of the network traffic between the plurality of containerized workloads to assess inter-containerized workload interactions in real time;
rank nodes on which to schedule execution of a containerized in the VCC based, at least in part, on the determined correspondence between the nodes and the determined affinities characterizing the dynamic communication patterns of the network traffic between the plurality of containerized workloads based, at least in part, on the determined traffic characteristics of the information derived from monitoring of the network traffic between the plurality of containerized workloads; and
schedule subsequent execution of a second containerized workload on a node in VCC based, at least in part, on the rank of the node;

wherein the network traffic comprises flows characterized by flow sizes, the flows being classified flow types based on the flow size as mouse flows or elephant flows, the affinities being associated with the flow types.

\* \* \* \* \*